(12) United States Patent
Gromat et al.

(10) Patent No.: US 9,161,311 B2
(45) Date of Patent: Oct. 13, 2015

(54) METHOD FOR MANAGING THE CHARGE LEVEL OF A BATTERY IN A MOBILE TERMINAL, CORRESPONDING MANAGEMENT SYSTEM AND COMPUTER PROGRAM

(75) Inventors: Hervé Gromat, Bois d'Arcy (FR); Christophe Gruet, Elancourt (FR); Hervé Mokrani, Sceaux (FR); Olivier Perrin, Saint-Aubin d'Ecrosville (FR)

(73) Assignee: CASSIDIAN SAS, Elancourt (FR)

(*) Notice: Subject to any disclaimer, the term of this patent is extended or adjusted under 35 U.S.C. 154(b) by 604 days.

(21) Appl. No.: 13/300,122

(22) Filed: Nov. 18, 2011

(65) Prior Publication Data
US 2012/0131364 A1 May 24, 2012

(30) Foreign Application Priority Data
Nov. 19, 2010 (FR) ...................................... 10 59562

(51) Int. Cl.
*G06F 1/32* (2006.01)
*H04W 52/02* (2009.01)

(52) U.S. Cl.
CPC ............ *H04W 52/0261* (2013.01); *Y02B 60/50* (2013.01)

(58) Field of Classification Search
CPC ........................... H04W 52/0261; Y02B 60/50
USPC ........................................................ 713/320
See application file for complete search history.

(56) References Cited

U.S. PATENT DOCUMENTS

| 6,898,438 | B1 | 5/2005 | Uchida |
| 7,224,937 | B2* | 5/2007 | Cheng .............................. 455/39 |
| 7,372,834 | B2* | 5/2008 | Kim et al. ...................... 370/331 |
| 8,401,585 | B2* | 3/2013 | Bottomley et al. ........... 455/522 |
| 2004/0203873 | A1* | 10/2004 | Gray .......................... 455/456.1 |
| 2004/0204181 | A1 | 10/2004 | Cromer et al. |
| 2007/0098009 | A1* | 5/2007 | Du et al. ........................ 370/445 |
| 2007/0121536 | A1 | 5/2007 | Aihara et al. |
| 2008/0058000 | A1* | 3/2008 | Tanaka et al. ............... 455/550.1 |
| 2008/0188177 | A1* | 8/2008 | Tan et al. ...................... 455/11.1 |
| 2008/0192666 | A1* | 8/2008 | Koskan et al. ................ 370/311 |
| 2009/0098914 | A1 | 4/2009 | Marin-Cocher et al. |
| 2009/0325622 | A1 | 12/2009 | Matsumura et al. |
| 2010/0145643 | A1 | 6/2010 | Katpelly et al. |
| 2010/0273486 | A1 | 10/2010 | Kharia et al. |

FOREIGN PATENT DOCUMENTS

WO   WO 2008/082769 A1   7/2008

OTHER PUBLICATIONS

French Preliminary Search Report from corresponding French Application No. 1059562 filed Nov. 19, 2010 (8 pages).

* cited by examiner

*Primary Examiner* — Nimesh G Patel
(74) *Attorney, Agent, or Firm* — Klein, O'Neill & Singh, LLP (57) ABSTRACT

The present disclosure relates to a method for managing the charge level of a battery of a mobile terminal connected to a network of transmission of information. The method comprises measuring the charge level of the battery. If the charge level of the battery is lower than a predefined threshold of charge level, the method controls the operation of the terminal to reduce its power consumption during an operation of transmission of information from or toward the terminal.

12 Claims, 3 Drawing Sheets

METHOD FOR MANAGING THE CHARGE LEVEL OF A BATTERY IN A MOBILE TERMINAL, CORRESPONDING MANAGEMENT SYSTEM AND COMPUTER PROGRAM

CROSS-REFERENCE TO RELATED APPLICATION

This application claims priority of French Application No. 1059562, filed Nov. 19, 2010, the contents of which are expressly incorporated herein by reference.

FIELD OF ART

The present disclosure relates to a method for managing the charge level of a battery in a mobile terminal. It also relates to a corresponding management system and computer program.

The present disclosure relates, more specifically, to the field of professional radioelectric mobile networks, better known as PMR (Professional Mobile Radio) networks.

BACKGROUND

Professional radioelectric mobile networks, or PMR networks, are secured radioelectric communication networks, generally used by Public Security bodies, such as firemen, police forces, gendarmerie forces and soldiers, or even by companies or administrations.

PMR terminal users use them within the context of often critical outside missions. Within this context, maintaining the charge of the battery at a level sufficient to be able to give and receive calls is a critical element for the lifetime of the mission.

In the past, PMR networks, to return to this example, only allowed voice and short data messages to be transmitted, so that the risk of the battery becoming completely discharged was limited. Currently, these networks also allow, in addition to voice, video and data of the file type, electronic messages, web pages, etc. to be transmitted. Now, these services are heavy power consumers, so that the risk of the battery becoming fully discharged during a mission is indeed real.

Document WO 2007/050687 describes a method for managing the charge level of a battery of a mobile terminal, wherein providing a service to the terminal is delayed as a result of the identification of a low charge level of the battery.

This method is however not applicable to the case of PMR networks, because it could not be contemplated to postpone providing a service, such as a telephone call or a transmission of a message etc., to a PMR terminal, the user of which carries out a critical, even vital, mission, in some situations.

SUMMARY

The present method, system and device aim at improving the situation.

To this end, the present disclosure first relates to a method for managing the charge level of a battery of a mobile terminal connected to an information transmission network, comprising:
 measuring the charge level of the battery; and
 if the charge level of the battery is lower than a predefined threshold of charge level, controlling the operation of the terminal to reduce its power consumption during an operation of transmission of information from or toward the terminal.

Thanks to the method of the present disclosure, it is thereby possible for the terminal to continue to emit and receive calls or other services while optimizing, that is reducing, the power consumption of the battery so as to prevent it from being completely discharged or at least to extend its potential time of use.

The present method, system and device also allow optimizing the lifetime of the measured charge level of the battery to be used.

Advantageously, the charge level of the battery is measured periodically by the terminal. The measured, optionally averaged values on a given period, are afterwards transmitted to the network on request or periodically.

According to a first embodiment of the present method, system and device, the step of controlling the operation of the terminal comprises:
 defining a plurality of intervals of charge levels of the battery;
 allocating an operation rule of the terminal at each interval of charge level of the battery; and
 controlling the operation of the terminal according to the rule allocated to the interval the measured charge level of the battery belongs to.

The operation rules could be selected amongst, for instance:
 a restriction of a rate allocated to the operation of transmission of information; or
 a prohibition of the operation of transmission of information.

Other operation rules could be provided as a restriction of the operations of transmission of information in the terminal based on the level of priority of the relevant operation or any other operation rule adapted for the operating mode of the users.

The implementation of such rules allows reducing the level of service being authorized to the terminal proportionally to the charge level of the battery.

With such operation rules, it is thereby possible to finely adapt the use of the different available services according to the charge level of the battery, so that the possibility of providing services considered as having priority is ensured, even when the charge level of the battery is low, that is lower than a predefined threshold of charge level, reducing the use of other services considered as having less priority. Thereby, the possibility is also ensured of providing a minimum service even when the charge level of the battery is low by reducing the level of service.

As an example, the rates allocated to the emission of information could be selected lower than the rates allocated to the reception because the emission consumes more power than the reception at the level of the terminal.

According to another example, when the charge level of the battery is extremely low, that is much lower than the predefined threshold, it is possible to decide to authorize only emergency calls.

Advantageously, the method further comprises storing a table comprising the intervals of charge levels and the operation rules corresponding to the level of the terminal and/or of the network.

It could, for instance, be contemplated providing this table at the level of a base station to which the mobile terminal is connected or also at the level of any server or node of the network and transmitting it afterwards to the terminal by means of a specific signalization. It is also possible to preliminarily provide this table to the terminal, for instance by a preliminary configuration carried out during a personalization of the terminal or by a specific signalization between the network upon an entry of the terminal or in the case of mobility of the terminal or spontaneously from the network.

According to a second embodiment of the present method, system and device, the controlling step comprises:

selecting an access link, from the terminal to the network, being optimum in terms of power consumption; and connecting the terminal to the network through the selected access link.

This allows avoiding the problem of the charge of the battery becoming weaker without reducing the level of service provided to the terminal using another access of the terminal to the network, being optimum in terms of power consumption, that is less power consuming.

Advantageously, the terminal being connected to the network via a first base station, the selecting sub-step comprises the selection of a second base station for replacing the first base station for connecting the terminal to the network.

This allows the terminal to connect to the network via the second base station, for instance closer thereto than the first base station, so as to consume less power upon subsequent operations of transmission of information.

The present method, system and device thereby allow advantageously and remarkably using the charge level of the battery as a criterion for triggering the mobility of the terminal while traditionally, the criterion to be used for triggering this mobility is the improvement of the quality of the communications with the terminal.

Alternatively, at least one first terminal and one second terminal being connected to the network, the sub-step of selection of an access link from the first terminal to the network comprises the selection of the second terminal as a connection relay of the first terminal to the network.

This third embodiment of the present method, system and device particularly applies to the case wherein the terminals connected to the network have available at least two types of technology of radio access or RAT (Radio Access Technology) that is a general access technology, of the WMAN (Wireless Metropolitan Area Network) type for instance, and a proximity access technology, of the WLAN/WPAN (Wireless Local Area Network/Wireless Personal Area Network) type, for instance. The WMAN general access technology could be, as an example, a PMR access technology or a GSM, UMTS access technology, etc. The WLAN/WPAN proximity access technology could be, as examples, a Bluetooth or a WIFI technology.

In this case, it is indeed advantageous, in terms of power consumption, to allow a mobile terminal having a low charge level of battery to connect to the network by means of a proximity access by connecting to another mobile terminal having a higher battery charge level.

Advantageously, the selection of the second terminal comprises:

measuring the charge levels of the batteries of a group of terminals connected to the network in a determined geographical area around the first terminal; and selecting the second terminal in the group as being the terminal the closest to the first terminal and having a battery charge level being sufficient for carrying out the operation of transmission of information.

This allows optimizing the selection of the second terminal while ensuring that the second terminal has a charge level of the battery being sufficient for providing a good quality of service for the first terminal.

For accurately selecting the second terminal, it could be provided to use the exact position of each mobile terminal thanks to a conventional localization mechanism of the GPS (Global Positioning System) type or the OTDOA (Observed Time Difference Of Arrival) type. Measurements of radio-electric fields could also be used, carried out by the mobile terminals of the group so as to qualify the power being received, coming from the base stations being associated therewith and from neighbouring base stations. Two terminals having similar measurement characteristics are considered, at first sight, as being very close.

It could also be contemplated that the first terminal carries out a scan of the WPAN type for finding the mobile terminal, connected to the same WPAN network being the closest.

In an alternative embodiment, the selection of the second terminal comprises:

measuring the charge levels of the batteries of a group of terminals connected to the network in a determined geographical area around the first terminal; and selecting the second terminal for balancing the charge levels of the batteries of all the terminals of the group.

This alternative embodiment is particularly advantageous within the scope of a mission carried out by a group of users of mobile terminals. It allows ensuring a correct individual mean charge level for each battery, so as to extend at the most the lifetime of the mission and to prevent the battery of one of the terminals from being completely discharged, which could compromise the whole mission.

According to another alternative embodiment adapted to a mission of a group, the selection of the second terminal comprises:

allocating a relative charge level of the battery to each terminal of a group of terminals connected to the network in a determined geographical area around the first terminal;

measuring the charge levels of the batteries of the terminals of the group; and selecting the second terminal for making sure that the charge level of the battery of each terminal of the group meets the relative charge level being allocated thereto.

This strategy is interesting when some terminals of a same group are considered more important than other terminals, for instance because their users have a more substantial role in the mission. This allows providing a battery charge level for each terminal as a function of its importance.

Advantageously, the method further comprises, in the case of a failure for a transmission of data from a calling entity to the terminal because its battery is discharged or because its charge level does not allow to accept the transmission, sending a notification to the calling entity notifying that the battery charge level of the terminal is low. This allows the calling entity, being typically another terminal connected to the information transmission network, to know the reason why the terminal being called does not reply, that is that the terminal being called has a low battery charge level and if appropriate to infer therefrom the appropriate actions.

Still advantageously, the method comprises a step of establishing a list of terminals connected to the network having a lower battery charge level than the predefined threshold.

This list is established, for instance, at the level of a control equipment of the network located in any node of the network or in a centralized control station, regularly receiving notifications from the base stations implemented in the network indicating to it the identifiers of the terminals having a low battery charge level.

Advantageously, the network is a PMR professional mobile network. Indeed, the charge level of the battery has a particular importance within the context of this type of network. Nevertheless, the present method, system and device advantageously apply to any other type of radioelectric network, for instance to GSM, GPRS, UMTS, LTE, etc. networks.

The present disclosure also relates to a system for managing the charge level of a battery of a mobile terminal for the implementation of the method of the disclosure, comprising means for controlling the operation of the terminal, arranged so as to control an access of the terminal to at least one service of the network as a function of the charge level of the battery.

These controlling means located at the level of the terminal itself or at the level of the network, allow to limit the access of the terminal to some services of the network, or to limit the level of the service being provided, or even to modify the access path of the terminal to the network.

The present method, system and device further relate to a computer program comprising instructions for the implementation of the method of the disclosure when the program is carried out by a processor.

BRIEF DESCRIPTION OF THE FIGURES

The flowcharts of FIGS. 2, 4 and 6 schematically illustrate the progress of this computer program, for different embodiments of the present method, system and device.

Embodiments of the present method, system and device will be now described more accurately with reference to the appended drawings wherein.

DETAILED DESCRIPTION

Figure 1:
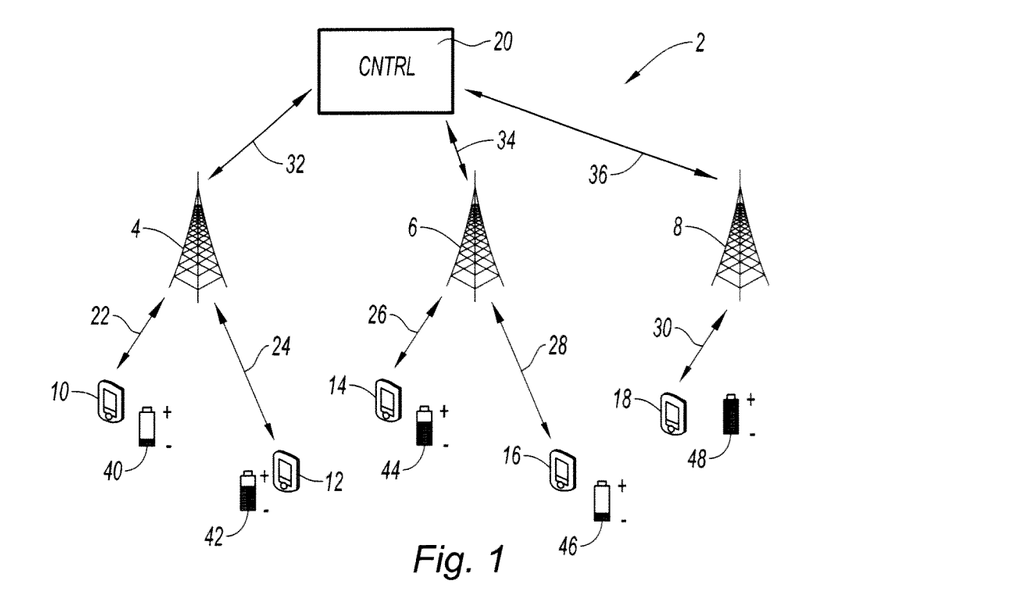
FIG. 1 is a diagram illustrating an example of an information transmission network wherein the present method, system and device could be implemented.

FIG. 1 illustrates a network 2 for transmission of information. The network 2 is preferably a PMR professional mobile network wherein base stations 4, 6, 8 are implemented for covering a determined geographical area so as to allow mobile terminals 10, 12, 14, 16, 18 to access to a set of PMR services. These services include the transmission of voice, of video and of data. The transmission of data could be a transmission of the file type, according to the File Transfer Protocol FTP for instance, electronic messages, web pages, SMS messages, etc.

The base stations 4, 6, 8 are connected to a control equipment 20 of the network 2 allowing to control their operation.

The control equipment 20 could be located at the level of a server in any node of the network 2 or at the level of a centralized control station.

The present method, system and device are not limited as far as the band width of the network 2 is concerned, so that it applies to wide band networks and to narrow band networks.

According to the architecture, as an example, shown on FIG. 1, the mobile terminals 10 and 12 are connected to the network 2 via the base station 4, the mobile terminals 14 and 16 are connected to the network 2 via the base station 6 and the mobile terminal 18 is connected to the network 2 via the base station 8.

Each mobile terminal is connected to the base station being associated therewith via a bi-directional radioelectric link. The mobile terminal thereby transmits information to the base station according to an upward link, referred to as an uplink symbolized by UL. The base station transmits information to the mobile terminal according to a downward link referred to as a downlink symbolized by DL.

The links of transmission of information between the mobile terminals 10, 12, 14, 16, 18 and the associated base stations 4, 6, 8 are shown, on the diagram of FIG. 1, by the bidirectional arrows 22, 24, 26, 28, 30, respectively. The transmissions of information on the links 22, 24, 26, 28, 30 could be of different types, for instance transmissions in a circuit mode, in a packet mode, in a direct mode, etc.

The base stations 4, 6, 8 are also connected to the control equipment 20 of the network 2 according to bidirectional links of transmission of information 32, 34, 36, respectively. The transmissions of information on the links 32, 34, 36, could be of different types, for instance transmissions in a circuit mode, in a packet mode, in a direct mode, etc.

Typically, in the PMR network 2, two types of services are proposed to the mobile terminals 10, 12, 14, 16, 18.

The first type of services requires a broadcast according to the downlink DL. A radioelectric bearer is used by each base station for distributing a downward traffic flux DL to the group of terminals being connected thereto. The corresponding upward flux UL is individually managed by each terminal through the allocation of a dedicated radioelectric bearer. This first type of services generally relates to the downlink transmission of voice and video.

The second type of services does not require downlink DL broadcast so that a dedicated radioelectric bearer is allocated both to the uplink UL and to the downlink DL. This second type of services mainly relates to the transmission of data of the file type, Internet, electronic mail, SMS messages, etc.

Each mobile terminal 10, 12, 14, 16, 18 has available respectively one battery 40, 42, 44, 46, 48 for supplying electric power to the different electronic circuitry making up the terminal. Each battery could be removable or fastened permanently on the terminal and it could be of the chargeable or not type.

Advantageously, means for measuring the charge level of the battery are provided so as to have accurately available the remaining charge level of the battery for each terminal.

Preferably, these measurement means are provided at each terminal.

It is also possible to provide these measurement means at the base stations or the control equipment of the network.

The charge level of each battery, measured in situ at the terminal or through tele-measurement at the base station or the control equipment of the network, is conventionally shown on FIG. 1 with a solid line separating a full area and an empty area between the negative and the positive terminals of the battery. The larger the empty area, the lower the charge level of the battery.

As an example, it appears that the charge level of the battery 48 of the terminal 18 is high, the charge level of the batteries 42 and 44 of the terminals 12 and 14 is mean and the charge level of the batteries 40 and 46 of the terminals 10 and 16 is low.

Preferably, the charge level of the battery is displayed on display means, of the screen type, of the terminal so that the user of the terminal is made aware of a drop of the charge level of the battery.

The present method, system and device advantageously apply in PMR networks, when one or more users provided with their mobile terminals go on a field mission for an undetermined period of time. These users generally have no means for recharging the battery of the terminal during a mission nor do they have available a spare battery so that it is vital for them to extend at most the lifetime of the battery.

The present method, system and device also provide using the measured charge level of the battery for optimizing its lifetime.

We assume in the remainder of the description that five users provided respectively with the terminals 10, 12, 14, 16, 18 are on a mission. The present method, system and device also apply to the cases where a lower or a higher number of users is on a mission.

Figure 2:
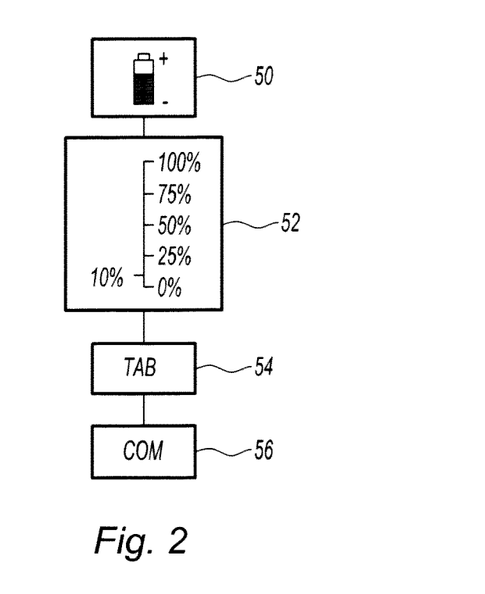
FIG. 2 is a flowchart illustrating the steps of the method according to a first embodiment of the present method, system and device.

The flowchart of FIG. 2 shows the steps of the method for managing the charge level of the battery according to a first embodiment.

The charge levels of the batteries 40, 42, 44, 46, 48 are measured, at step 50, preferably periodically, by the measurement means, preferably provided respectively at the terminals 10, 12, 14, 16, 18. The measured values, optionally averaged on a given period, are afterwards transmitted to the network 2, via the base stations 4, 6, 8, on request or periodically. The period of transmission of the measured values could be different from the period of measurement.

According to the first embodiment of the present method, system and device, several intervals of charge level of the battery are defined at step 52, for instance in terms of percentage of the maximum charge level of the battery.

As an example, these are [0,10%]. [10%,25%]. [25%,50%]. [50%.75%] and [75%.100%] intervals.

Advantageously, at step 54, an operation rule of the terminal is allocated to each interval of charge level of the battery.

It could be contemplated allocating this operation rule for instance during a configuration of the terminal or even downloading it from a node of the network.

Preferably, a table comprising the intervals of charge level defined at step 52 and the corresponding operation rules is stored at each terminal and/or at each base station and/or at the control equipment of the network.

Steps 52 and 54 are preliminary steps of the present method, this means that the table associating the operation rules with the intervals of the charge level is preliminarily provided, before the mission. This table is, preferably, the same for terminals using the same types of batteries. It is assumed that the table is identical for the terminals 10, 12, 14, 16 and 18.

Advantageously, the operation rules associated with a charge level lower than a given threshold are selected amongst a restriction of a rate allocated to a subsequent operation of transmission of information of the terminal or a prohibition of such an operation.

The table 1 is an example of a table associating operation rules with intervals of charge level.

This table 1 is first based on the fact that an emission consumes more power than a reception so that the rates allocated to operations of emission in an uplink UL are more restricted than those allocated to operations of reception in a downlink DL.

In addition, table 1 is also based on the fact that the different services consume more or less power according to their characteristics in terms of binary rate (expressed in kilobits per second kbps), of constraints whether in real time or not, of level of reliability, etc.

Another criterion for drafting table 1 is the level of priority of the different services. Thus, emergency calls should be authorized even when the charge level of the battery is extremely low.

TABLE 1

| Charge level | Voice | Video | Data (ftp, e-mail, web, SMS) |
|---|---|---|---|
| 76%-100% | DL: authorized<br>UL: authorized | DL: authorized<br>UL: authorized | DL: authorized<br>UL: authorized |
| 51%-75% | DL: authorized<br>UL: authorized | DL: authorized<br>UL: authorized with a restriction of rate (up to 384 kbps) | DL: authorized<br>UL: authorized with a restriction of rate (up to 384 kbps) |
| 26%-50% | DL: authorized<br>UL: authorized but limited to a reduced set of available vocal calls | DL: authorized with a restriction of rate (up to 512 kbps)<br>UL: authorized with a restriction of rate (up to 128 kbps) | DL: authorized with a restriction of rate (up to 512 kbps)<br>UL: authorized with a restriction of rate (up to 256 kbps) |
| 11%-25% | DL: authorized but limited to a reduced set of available vocal calls<br>UL: authorized but limited to emergency vocal calls | DL: authorized with a restriction of rate (up to 384 kbps)<br>UL: authorized with a restriction of rate (up to 64 kbps) | DL: authorized with a restriction of rate (up to 384 kbps)<br>UL: authorized with a restriction of rate (up to 128 kbps) |
| 1%-10% | DL: authorized but limited to emergency vocal calls<br>UL: authorized but limited to emergency vocal calls | DL: authorized with a restriction of rate (up to 128 kbps)<br>UL: unauthorized | DL: authorized with a restriction of rate (up to 128 kbps)<br>UL: authorized with a restriction of rate (up to 64 kbps) |

At step 56, the operation of each of the terminals is controlled according to the operation rule allocated to the interval the measured charge level of the battery belongs to.

Thus, the battery 48 having a charge level of 100%, the terminal 18 can continue to emit and receive voice, video and data calls without restriction.

The batteries 42 and 44 having, based on an assumption a charge level ranging between 51% and 75%, the terminals 12 and 14 can continue to receive communications of any type, but can only emit vocal calls or video and data with a rate restricted to 384 kbps.

The batteries 40 and 46 having, based on an assumption, a charge level lower than 10%, the terminals 10 and 16 can only receive emergency vocal calls, or video and data with a rate lower than 128 kbps and can only emit emergency vocal calls or data with a rate lower than 64 kbps.

Thus, the first embodiment advantageously makes it possible to reduce the authorized level of service for each terminal proportionally to its level of battery.

Figure 3:
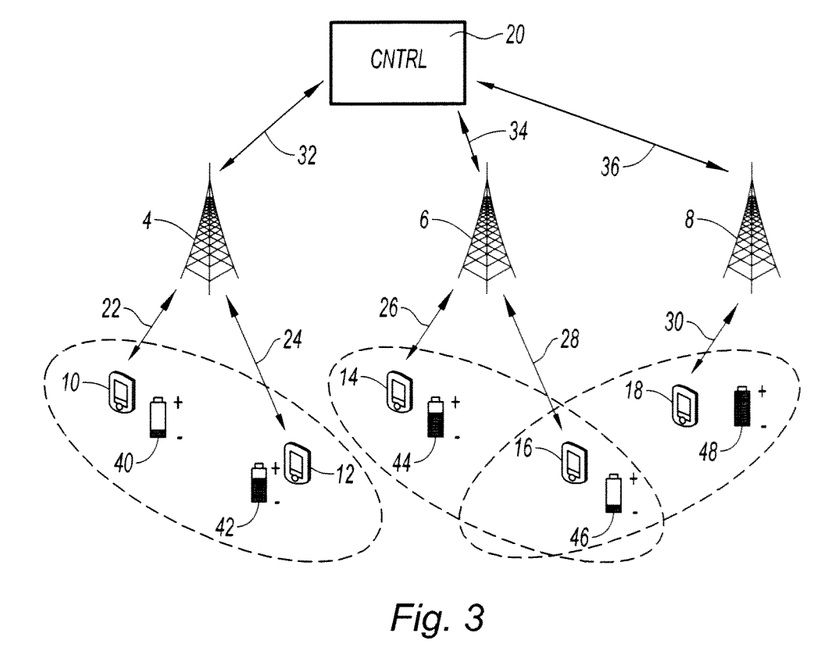
FIG. 3 is a diagram illustrating the implementation of a second embodiment of the present method, system and device in the network of FIG. 1.

FIG. 3 schematically illustrates a second embodiment of the method of the present method, system and device.

According to this second embodiment, when the battery charge level of the terminal becomes lower than a determined threshold, another base station is selected for replacing the base station associated with the terminal for connecting the latter to the network so as to minimize the power consumption of the terminal upon a subsequent operation of transmission of information.

According to the example illustrated in FIG. 3, the battery 46 having a low charge level for instance lower than a predefined threshold, the terminal 16 selects the base station 8 for replacing the base station 6, the access to the network via this base station 8, for instance closest to the terminal 16, being more advantageous in terms of power consumption.

Naturally, this selection could be autonomous at the terminal 16 or could be even controlled by the control equipment 20 of the network 2 or still by the base station 6.

Figure 4:
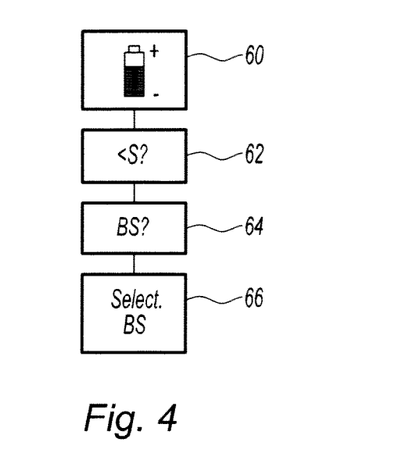
FIG. 4 is a flowchart illustrating the steps of the method according to the second embodiment of the present method, system and device.

The steps of the method, according to this second embodiment, are illustrated by the flowchart of FIG. 4.

At step 60, the battery charge level is measured, preferably periodically similarly as at step 50 of the first embodiment.

At step 62, the measured charge level is compared to a predefined charge level threshold.

If the measured charge level is lower than the predefined threshold, the terminal carries out, at step 64, an investigation about at least one base station it is likely to connect to so as to optimize its power consumption during its communications with the network 2.

At step 64, the terminal selects the base station allowing it to optimize its power consumption.

The new selected base station is, for instance, closer to the terminal than the initial base station being associated therewith, so that the terminal consumes less battery charge upon a subsequent operation of transmission of information by connecting to this new base station.

In the case of the example of FIG. 3, the batteries 42, 44 and 48 have a higher charge level than the predefined threshold, being equal to 25% for instance. Thus, no investigation about a new base is carried out by the terminals 12, 14 and 18.

The battery 40 has a charge level lower than the predefined threshold so that the terminal 10 carries out the investigation of step 64. However, this terminal 10 does not find any base station allowing for a more advantageous access than the base station 4 in terms of power consumption. The terminal 10 thus does not select any new base station for connecting to the network 2.

The battery 46 has a charge level lower than the predefined threshold so that the terminal 16 carries out the investigation of step 64. The terminal 16 finds that the base station 8 offers a more advantageous access than the base station 6 in terms of power consumption. The terminal 16 thus selects, at step 66, the base station 8 for replacing the base station 6, for connecting to the network 2.

Figure 5:
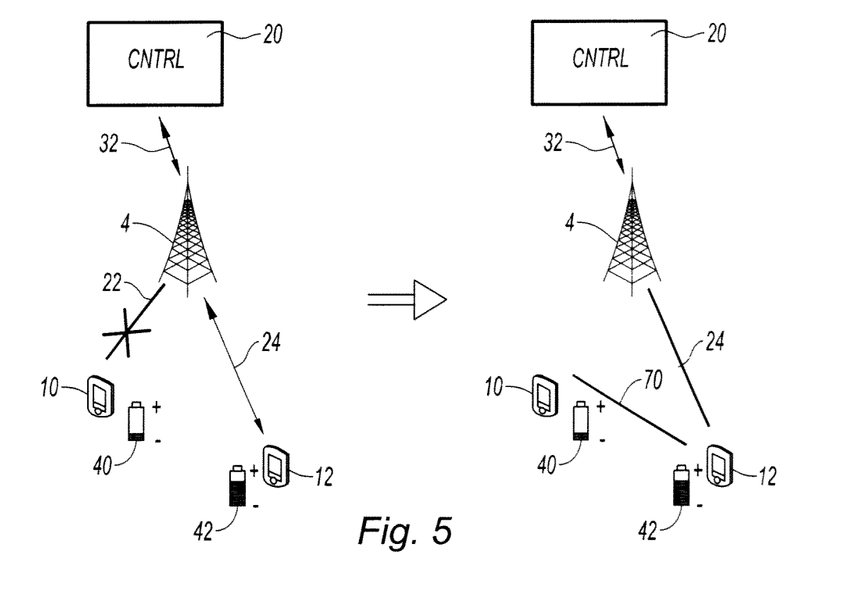
FIG. 5 is a diagram illustrating the implementation of a third embodiment of the present method, system and device in the network of FIG. 1.

FIG. 5 illustrates a third embodiment of the present method, system and device.

According to this third embodiment, when the battery charge level of a first terminal becomes lower than a determined threshold, a second terminal, having a higher battery charge level than this threshold, is selected as a connection relay of the first terminal for connecting the latter to the network so as to minimize the power consumption of the first terminal upon a subsequent operation of transmission of information.

Figure 6:
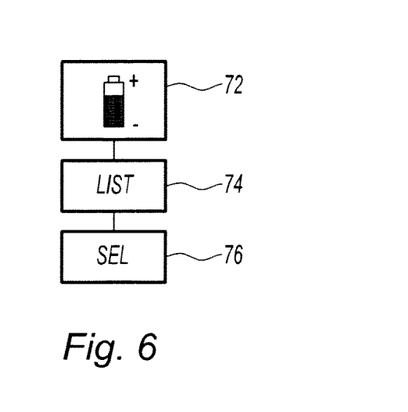
FIG. 6 is a flowchart illustrating the steps of the method according to the third embodiment of the present method, system and device.

According to the example illustrated on FIG. 5, the battery 40 having a low charge level and the battery 42 having a high charge level, the terminal 10 selects the terminal 12, as described in the remainder of the description with reference to FIG. 6, as a connection relay to the network 2. Thus, the terminal 10 is no longer connected to the base station 4 through the link 22, but via the terminal 12 through a link of transmission of information 70.

This preferred embodiment of the present method, system and device advantageously apply to a PMR network wherein the terminals access to the network by means of a general access technology of the WMAN type and offer locally a proximity access technology of the WLAN/WPAN type, for instance Wi-Fi and/or Bluetooth and/or PMR in a direct mode, referred to as PMR DMO (Direct Mode). In such a network, all the terminals could operate as WLAN proximity relays for all the terminals connected according to a WPAN personal access.

This preferred embodiment of the present method, system and device thus allow authorizing terminals having a low battery charge level, such as the terminal 10, to prefer a WPAN access, such as access 70, to connect to a close terminal, such as the terminal 12, having a higher battery charge level.

The flow diagram of FIG. 6 illustrates the steps of the method for managing the battery according to the third embodiment of the present method, system and device.

At step 72, the battery charge levels of the terminals connected to the network 2 and present in a given geographical area are measured and supplied to the control equipment 20 of the network 2. This, preferably periodical, measurement is carried out either in situ by the means for measuring the battery charge level of each terminal, then transmitted to the control equipment 20 of the network 2, either through tele-measurement at the level of the base stations, and then transmitted to the control equipment 20 or directly through tele-measurement at the level of the control equipment 20.

Advantageously, the terminals carry out these measurements on the carriers of the broadcast channel BCCH (Broadcast Control Channel) by measuring the levels of BCCH reception.

In one embodiment, the measurements relate to all the terminals connected to the network being present in the geographical area. The geographical localization of the terminals is known to the control equipment 20 by means of conventional methods of the GPS or OTDOA type, for instance.

In a preferred alternative, the measurements only relate to a group of terminals connected to the network, this group being predefined, or defined from information transmitted by a node of the network such as the control station, and corresponding, for instance, to the terminals of a group of users involved in one single same mission.

Thus at the end of step 72, the control equipment 20 has available the charge levels of the batteries of all the terminals of the group connected to the network.

At step 74, the control equipment 20 transmits to the terminals having a low charge level, that is a lower charge level than a predefined threshold of charge level, a list of terminals having a higher battery charge level and to which it would be of interest to be connected with a WPAN personal access for saving the battery charge.

Advantageously, this list comprises the terminals having the same type of BCCH measurements, at within about one margin, as the terminal with a low battery level for which it is established.

Advantageously, the control equipment 20 allocates the levels of priority to the terminals of this list according to the capacities of each terminal. For instance, if the terminal 10 is mounted on a vehicle, portable terminals are avoided as they offer a lower panel of services than the terminal 10. Indeed, the terminals mounted on vehicles allow, for instance, to control from the cabin of the vehicle, different pieces of radio equipment while the portable terminals do not allow such a control because of their lower capacity.

Alternatively, the list of terminals is not established by the control equipment of the network, but by the terminal 10 carrying out a scan of the WPAN type for finding the closest mobile terminals, connected to the same WPAN network.

Naturally, the list could also be established at the level of the base station 4.

Upon the reception of the list, the terminal 10 selects, at step 76, a terminal in the list as a connection relay to the network 2.

According to the example of FIG. 5, the terminal 10 selects the terminal being the closest thereto, that is the terminal 12 in the example.

The terminal 10 then communicates with the network 2 according to a conventionally defined protocol. As an example, a point-to-point WPAN signalization is established between the terminals 10 and 12 for the transmission of information from the terminal 10 to the terminal 12 for the uplink UL, from the terminal 10 to the base station 4, and from the terminal 12 to the terminal 10 for the downlink DL, from the base station 4 to the terminal 10.

Obviously, this strategy could be extended to a number of terminals higher than two.

A collective strategy could also be implemented aiming at optimizing the global charge level of all the batteries of the group.

In this case, the selection is carried out for balancing the charge levels of the batteries of all the terminals of the group. Such a balancing tends for instance to result in all the terminals of the group having one single same charge level at the end of a predetermined period of time.

Alternatively, some terminals being considered as more important, corresponding for instance to the most sensitive positions within the context of the mission, a relative charge level of the battery is allocated to each terminal of the group.

It could be contemplated allocating the charge level relative to each terminal by configuring it or even by acquiring this relative charge level from the control equipment, for instance.

The selection is then carried out maintaining the relative charge level of each terminal of the group.

Advantageously, it could be contemplated that in the case of a failure in a transmission of data from a first terminal to a second terminal having a low battery level, for instance lower than a predefined charge level, the control equipment of the network sends a notification to the first terminal notifying it that the battery charge level of the second terminal is low.

This could be carried out thanks to the regular transmission through the base stations implemented in the network toward the control equipment of a list of identifiers of terminals having a low battery level.

Advantageously, each terminal transmits periodically the measured charge level of the battery to the base station being associated therewith. The periodicity of this transmission could be advantageously selected as a function of this charge level so as to save the charge of the battery. Thus, the periodicity of this transmission could be selected longer when the battery charge level of the terminal is low and shorter in the opposite case.

Naturally, other embodiments could be still contemplated. For instance, the regular update by the control equipment of the list of the terminals having a low battery level may be employed for triggering the step of control of the operation of these terminals according to any of the strategies implemented with reference to FIGS. 1 to 6 for limiting the access of the terminal to some services of the network or for providing it with a reduced service or even for modifying the access path of the terminal to the network.

In addition, the different described embodiments could be advantageously combined.

Thus, it could be contemplated allocating to an interval of charge level defined at step 52 of the first embodiment an operation rule triggering the selection of a new base station or of a new mobile terminal as a connection relay of the terminal to the network.

Although the disclosure herein refers to certain specific embodiments, it is to be understood that these embodiments are presented by way of example and not by way of limitation. The intent of the foregoing detailed description, although discussing exemplary embodiments, is to be construed to cover all modifications, alternatives, and equivalents of the embodiments as may fall within the spirit and scope of the invention as defined by the claims.

The invention claimed is:

1. A method for managing a charge level of a battery of a first mobile terminal connected to a network for transmission of information, comprising:
   measuring the charge level of the battery of the first mobile terminal; and if the charge level of the battery is lower than a predefined threshold charge level, controlling operation of the first mobile terminal to reduce the first mobile terminal's power consumption upon operation of transmission of information to or from the first mobile terminal;
   wherein controlling the operation of the first mobile terminal comprises:
      selecting an access link from the first mobile terminal to the network, the access link being optimum in terms of power consumption;
      connecting the first mobile terminal to the network through the access link; and
      wherein selecting the access link from the first mobile terminal to the network comprises selecting a second mobile terminal connected to the network as a connection relay of the first mobile terminal to the network;
   wherein selecting of the second mobile terminal comprises:
      allocating a relative charge level to a plurality of batteries of a group of terminals connected to the network in a determined geographical area around the first mobile terminal, the relative charge level being set according to a ranking of each terminal of the group of terminals within a context of a mission;
      measuring charge levels of the plurality of batteries of the group of terminals; and
      selecting the second mobile terminal for ensuring that each charge level of each battery of the plurality of batteries of the group of terminals meets the relative charge level being allocated thereto.

2. The method according to claim 1, wherein controlling the operation of the first mobile terminal comprises:
defining a plurality of intervals of charge levels of the battery;
allocating an operation rule of the first mobile terminal to each interval of charge level of the plurality of intervals of charge levels of the battery; and
controlling the operation of the first mobile terminal according to the rule allocated to the interval the measured charge level of the battery belongs to.

3. The method according to claim 2, further comprising storing a table comprising the intervals of charge levels and the operation rules corresponding to the level of the first mobile terminal and the network.

4. The method according to claim 2, wherein the operation rules are:
a restriction of a rate allocated to the operation of transmission of information; or
a prohibition of the operation of transmission of information.

5. The method according to claim 1, wherein the first mobile terminal is connected to the network via a first base station, the selecting the access link from the first mobile terminal to the network comprises: selecting a second base station for replacing the first base station for connecting the first mobile terminal to the network.

6. A system for managing the charge level of a battery of a first mobile terminal for the implementation of the method according to claim 1, comprising control means for the operation of the first mobile terminal, arranged for controlling an access of the first mobile terminal to at least one service of the network as a function of the charge level of the battery, wherein the control means comprise means for:
selecting a second mobile terminal being connected to the network as a connection relay of the first mobile terminal to the network; and
connecting the first mobile terminal to the network via the second mobile terminal.

7. The system according to claim 6, wherein the control means comprise means for:
defining a plurality of intervals of charge levels of the battery;
allocating an operation rule of the first mobile terminal to each interval of charge level of the battery; and
controlling the operation of the first mobile terminal according to the rule allocated to the interval the charge level of the battery.

8. The system according to claim 6, wherein the first mobile terminal is connected to the network via a first base station, and the control means comprise means for:
selecting a second base station for replacing the first base station for connecting the first mobile terminal to the network; and
connecting the first mobile terminal to the network via the second base station.

9. A computer implemented method for managing a charge level of a battery comprising:
measuring the charge level of the battery; and if the charge level of the battery is lower than a predefined threshold of charge level controlling operation of a first mobile terminal to reduce the first mobile terminal's power consumption during an operation of transmission of information from or toward the first mobile terminal;
wherein controlling the operation of the first mobile terminal comprises:
selecting an access link from the first mobile terminal to a network, said access link being optimum in terms of power consumption; and
connecting the first mobile terminal to the network through the access link;
wherein selecting the access link from the first mobile terminal to the network comprises selecting a second mobile terminal being connected to the network as a connection relay of the first mobile terminal to the network;
wherein selecting the second mobile terminal comprises:
allocating a relative charge level to a plurality of batteries of a group of terminals connected to the network in a determined geographical area around the first mobile terminal, the relative charge level being set according to a ranking of each terminal of the group of terminals within a context of a mission;
measuring charge levels of the plurality of batteries of the group of terminals; and
selecting the second mobile terminal for ensuring that each charge level of each battery of the plurality of batteries of the group of terminals meets the relative charge level being allocated thereto.

10. The method according to claim 9, wherein controlling the operation of the first mobile terminal comprises:
defining a plurality of charge levels intervals for the battery;
allocating an operation rule of the first mobile terminal to each interval of charge level of the battery; and
controlling the operation of the first mobile terminal according to the rule allocated to the interval the charge level of the battery.

11. The method according to claim 9, wherein the operation rule relates only to transmission of data, and not voice communications.

12. The method according to claim 10, wherein the operation rule relates only to transmission of data, and not voice communications.

* * * * *